United States Patent
Pande et al.

(10) Patent No.: US 11,269,172 B2
(45) Date of Patent: Mar. 8, 2022

(54) METHOD AND SYSTEM FOR RECONSTRUCTING A FIELD OF VIEW

(71) Applicant: SIGTUPLE TECHNOLOGIES PRIVATE LIMITED, Bangalore (IN)

(72) Inventors: Harshit Pande, Bengaluru (IN); Abdul Aziz, Kolkata (IN); Bharath Cheluvaraju, Bangalore (IN); Tathagato Rai Dastidar, Bangalore (IN); Apurv Anand, Bengaluru (IN); Rohit Kumar Pandey, Bangalore (IN)

(73) Assignee: SIGTUPLE TECHNOLOGIES PRIVATE LIMITED, Bangalore (IN)

( * ) Notice: Subject to any disclaimer, the term of this patent is extended or adjusted under 35 U.S.C. 154(b) by 745 days.

(21) Appl. No.: 16/068,396

(22) PCT Filed: Feb. 8, 2018

(86) PCT No.: PCT/IB2018/050776
§ 371 (c)(1),
(2) Date: Jul. 6, 2018

(87) PCT Pub. No.: WO2019/102272
PCT Pub. Date: May 31, 2019

(65) Prior Publication Data
US 2021/0165204 A1    Jun. 3, 2021

(30) Foreign Application Priority Data

Nov. 24, 2017  (IN) .............................. 201741042285

(51) Int. Cl.
*G06T 7/00*    (2017.01)
*G02B 21/36*   (2006.01)
(Continued)

(52) U.S. Cl.
CPC ............ *G02B 21/367* (2013.01); *G06T 5/002* (2013.01); *G06T 5/50* (2013.01); *G06T 7/55* (2017.01);
(Continued)

(58) Field of Classification Search
CPC ...... G02B 21/367; G02B 21/14; G02B 21/06; G02B 21/0008; G02B 21/0032;
(Continued)

(56) References Cited

U.S. PATENT DOCUMENTS

| 7,596,249 | B2* | 9/2009 | Bacus ...................... G06T 3/40 382/128 |
| 2003/0184730 | A1* | 10/2003 | Price ........................ G06T 5/50 356/39 |

(Continued)

FOREIGN PATENT DOCUMENTS

WO   WO-2015160286 A1 * 10/2015 ......... G06K 9/00134

*Primary Examiner* — Jose L Couso
(74) *Attorney, Agent, or Firm* — Foley & Lardner LLP

(57) ABSTRACT

Embodiments of present disclosure discloses system and method for reconstruction of FOV. Initially, presence of one of single object and distinct objects in FOV of image of sample comprising one or more objects is determined based on sharpness of one or more objects. A single optimal representation of FOV may be generated when presence of single object is determined. At least one of single optimal representation and a depth-based enhanced representation of FOV may be generated when presence of distinct objects is determined. For generating depth-based enhanced representation, one or more first optimal images associated with each of distinct objects in FOV may be retrieved. An optimal representation of each of distinct objects is generated based on corresponding one or more first optimal images. Further, optimal representation of each of distinct objects is placed at corresponding optimal depth associated with respective distinct object to generate depth-based enhanced representation.

14 Claims, 9 Drawing Sheets

(51) Int. Cl.
*G06T 7/55* (2017.01)
*G06T 5/00* (2006.01)
*G06T 5/50* (2006.01)

(52) U.S. Cl.
CPC ............... *G06T 2207/10056* (2013.01); *G06T 2207/20072* (2013.01); *G06T 2207/30024* (2013.01)

(58) Field of Classification Search
CPC ............ G02B 21/0056; G02B 21/0064; G02B 21/26; G02B 21/365; G02B 21/0028; G02B 21/241; G02B 21/244; G02B 21/002; G02B 21/0075; G02B 21/58; G02B 27/58; G02B 6/065; G06T 5/50; G06T 5/002; G06T 7/55; G06T 7/11; G06T 7/13; G06T 7/136; G06T 7/187; G06T 7/002; G06T 7/50; G06T 2207/10056; G06T 2207/20072; G06T 2207/30024; G06T 2207/10148; G06T 2207/20221; G06T 2207/10061; G06T 2207/30004; G06T 2207/10028; G06T 2207/20124; G03H 1/0443; G03H 1/0866; G03H 2001/005; G03H 2240/56; G01B 9/02048; G01B 9/02; G01B 9/04; G01B 11/22; A61B 5/0066; A61B 5/0073; A61B 5/0075; A61B 5/1076; A61B 1/00009; A61B 1/05; A61B 1/063; A61B 1/0638; A61B 1/0646; G01N 21/4795; G01N 21/453; G01N 21/27; G01N 2021/1765; G01N 23/046; G01N 2223/419; G01N 33/4833; G01N 15/1429; G01N 15/1434; G01N 15/1463; G01N 15/1475; G01N 2015/1006; G01J 3/0208; G01J 3/10; G01J 3/45; G06K 9/00127; G06K 9/00134; G06K 9/0014; G06K 9/00208; G06K 9/2027; G06K 9/4652; G06K 9/00496; G06K 9/00503; G06K 9/2018; G06K 9/00201; G06K 2009/00932; G06K 2009/2045; G06K 2009/403; Y10S 128/922

See application file for complete search history.

(56) References Cited

U.S. PATENT DOCUMENTS

| | | | | |
|---|---|---|---|---|
| 2011/0090326 | A1* | 4/2011 | Kenny | G06K 9/00134 348/79 |
| 2011/0282181 | A1* | 11/2011 | Wang | A61B 6/4007 600/407 |
| 2014/0118529 | A1* | 5/2014 | Zheng | G02B 21/367 348/80 |
| 2015/0221105 | A1* | 8/2015 | Tripathi | H04N 13/30 382/131 |
| 2015/0310613 | A1* | 10/2015 | Murakami | H04N 5/23229 382/128 |
| 2016/0320602 | A1* | 11/2016 | Kazemzadeh | G03H 1/0443 |
| 2017/0322516 | A1* | 11/2017 | Hsiao | G03H 1/0866 |
| 2018/0128681 | A1* | 5/2018 | Otsuka | A61B 1/00009 |
| 2019/0137932 | A1* | 5/2019 | Ozcan | G03H 1/0443 |
| 2020/0302144 | A1* | 9/2020 | Leshem | G01B 11/22 |
| 2020/0310100 | A1* | 10/2020 | Ozcan | G03H 1/0866 |

* cited by examiner

METHOD AND SYSTEM FOR RECONSTRUCTING A FIELD OF VIEW

CROSS-REFERENCE TO RELATED PATENT APPLICATIONS

The present application claims priority under 37 U.S.C. § 371 to International Patent Application No. PCT/IB2018/050776, filed on Feb. 8, 2018, which is based upon and claims the benefit of priority to Indian Patent Application No. 201741042285, filed on Nov. 24, 2017. The disclosures of which are all hereby incorporated herein by reference in their entireties.

TECHNICAL FIELD

The present subject matter is related in general to the field of microscopic technology, more particularly, but not exclusively to a system and method for reconstructing a field of view of an image of a sample comprising one or more objects.

BACKGROUND

A sample, which may be a multi-layer sample, may comprise one or more objects across plurality of depths in the sample. Examination or analysis of the sample may comprise capturing one or more images of the sample, where each of the one or more images may be captured at each of the plurality of depths. The one or more images may be provided to a user who examines each of the one or more images for analysing the sample. Some of the one or more images may include redundant information which do not require to be examined. However, without awareness of which images to examine, the user may examine all of the one or more images of each of the one or more objects. This may lead the user to examine the same object multiple times, making the examination a tedious process.

One or more existing techniques may disclose to select optimal images from the one or more images of each of the one or more objects. The selected optimal images may provide best optimal representation of corresponding object. It may be easier for the user to examine the optimal images instead of each of the one or more images. However, the process may be still tedious if there exists plurality of optimal images for each of the one or more objects. Further, consider a scenario where more than one object may be present in a FOV of an image of the sample. Each of the objects may be suspended across a range of depths in same FOV of the sample. In such scenarios, the user may not be aware of the presence of more than one object in the FOV. The user may miss out to examine each of the objects. By which, the accuracy of the analysis may also be affected.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method for reconstructing a Field Of View (FOV). For the reconstruction, initially, presence of one of a single object and two or more distinct objects in a FOV of an image of a sample comprising one or more objects is determined based on sharpness of the one or more objects. A single optimal representation of the FOV may be generated when the presence of the single object is determined. At least one of the single optimal representation and a depth-based enhanced representation of the FOV may be generated when the presence of the two or more distinct objects is determined. For generating the depth-based enhanced representation, one or more first optimal images associated with each of the two or more distinct objects in the FOV may be retrieved. An optimal representation of each of the two or more distinct objects is generated based on the corresponding one or more first optimal images. Further the optimal representation of each of the two or more distinct objects is placed at a corresponding optimal depth associated with respective distinct object to generate the depth-based enhanced representation.

In an embodiment, the present disclosure relates to a FOV reconstruction system for reconstructing a FOV. The FOV reconstruction system includes a processor and a memory, and the memory is communicatively coupled to the processor. The memory stores processor-executable instructions which on execution cause the processor to perform the reconstruction. For the reconstruction, initially, presence of one of a single object and two or more distinct objects in a FOV of an image of a sample comprising one or more objects is determined based on sharpness of the one or more objects. A single optimal representation of the FOV may be generated when the presence of the single object is determined. At least one of the single optimal representation and a depth-based enhanced representation of the FOV may be generated when the presence of the two or more distinct objects is determined. For generating the depth-based enhanced representation, one or more first optimal images associated with each of the two or more distinct objects in the FOV may be retrieved. An optimal representation of each of the two or more distinct objects is generated based on the corresponding one or more first optimal images. Further the optimal representation of each of the two or more distinct objects is placed at a corresponding optimal depth associated with respective distinct object to generate the depth-based enhanced representation.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

Figure 1:
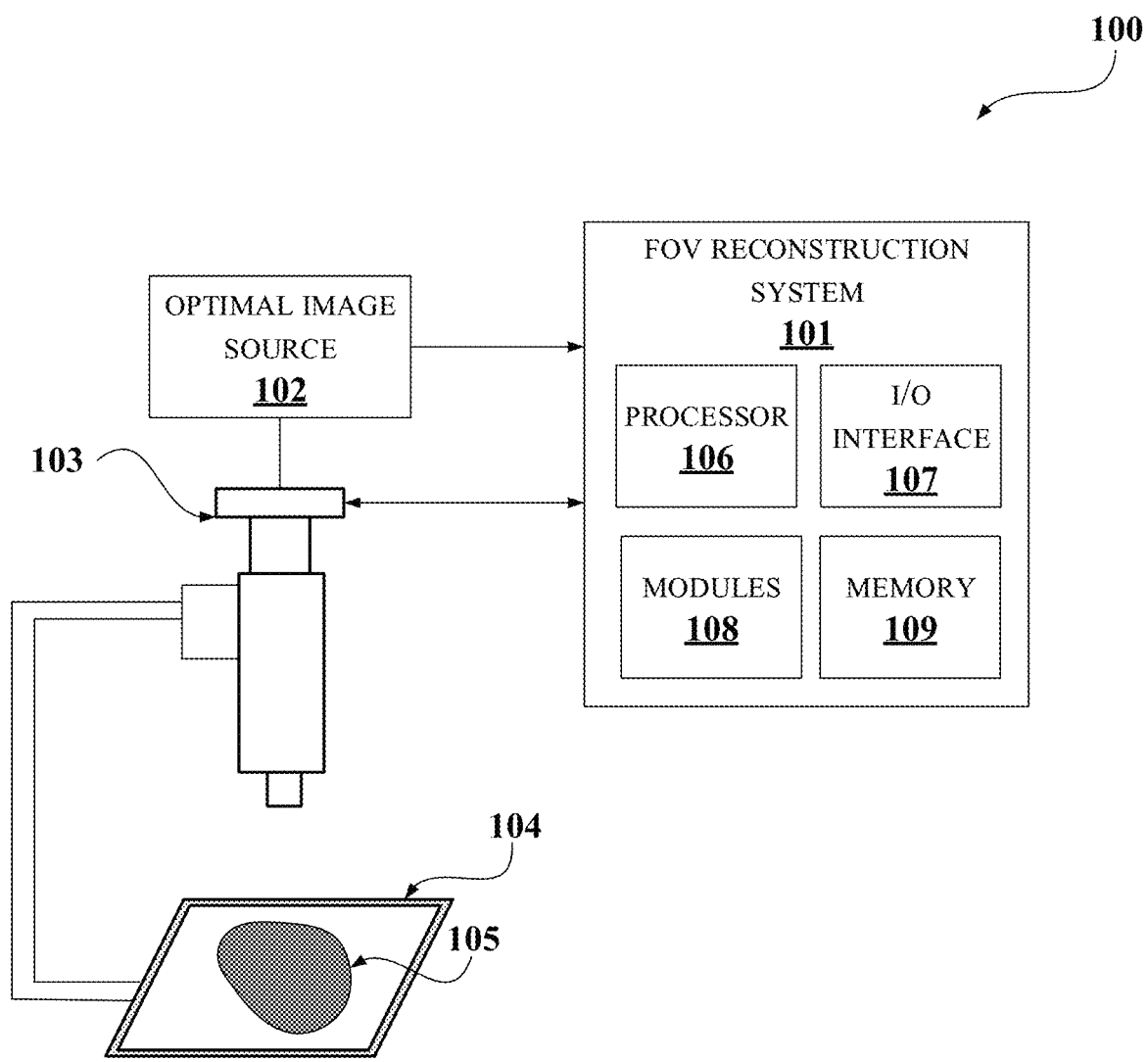
FIG. 1 illustrates an exemplary environment for reconstructing a FOV in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus preceded by "comprises . . . a" does not, without more constraints, preclude the existence of other elements or additional elements in the system or method.

The terms "includes", "including", or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Reconstruction of a FOV of an image of a sample comprising one or more objects aims at providing optimal representation of each of the one or more objects present in the FOV. In the present disclosure, one or more optimal images of each of the one or more objects in the FOV may be used for the reconstruction. Initially, number of distinct objects above each other in the FOV present in the FOV is determined. A single optimal representation may be opted when presence of a single object is determined in the FOV. At least one of the single optimal representation and a depth-based enhanced representation may be opted when presence of two or more distinct objects are determined in the FOV. In depth-based enhanced representation, one or more optimal images of each of the two or more distinct objects may be retrieved for generating an optimal representation of corresponding distinct object. Further, the optimal representation may be placed at optimal depth associated with respective distinct object. In the reconstruction proposed in the present disclosure, image from each of the plurality of depth may be considered to determine the optimal images which is used for the reconstruction. By this, the user may be able to examine any number of objects at any depth in the sample. Further, by reconstructing every FOV in the image, best representation of the image of the sample may be provided to the user. Time taken by a user for the examination of the FOV may also be reduced with the best representation.

FIG. 1 illustrates an exemplary environment 100 of a FOV reconstruction system 101. The exemplary environment 100 comprises the FOV reconstruction system 101, an optimal image source 102, a microscope 103, a stage 104 and a sample 105 on the stage 104 under the microscope 103. The FOV reconstruction system 101 may be configured to reconstruct a FOV from one or more FOVs of an image of the sample 105. The sample 105 may be a multi-layer sample comprising one or more objects across plurality of depths in the sample 105. The sample 105 may include, but is not limited to, urine, blood, semen, tissue, smear, body fluid, biological fluid, cells, biopsy and so on, obtained from a subject. The subject may be a human being, an animal or a plant. In an embodiment, the one or more objects in the sample 105 may include, but are not limited to, at least one of Red Blood Cell (RBC), White Blood Cell (WBC), RBC clump, WBC clump, epithelial cell (also referred as epithelial), cast, bacteria, yeast, parasite, mucus, sperm, crystal, artefact, malignant cell and so on. In an embodiment, the sample may be placed on the stage under the microscope for the reconstruction. In an embodiment, focus on the FOV may be achieved using the microscope 103. The FOV reconstruction system 101 may communicate with the microscope 103 via a communication network (not shown in the figure). In an embodiment, the communication network may include, without limitation, a direct interconnection, Local Area Network (LAN), Wide Area Network (WAN), wireless network (e.g., using Wireless Application Protocol), the Internet, and the like). One or more optimal images associated with each of the one or more objects in the FOV may be retrieved from the optimal image source 102 for the reconstruction of the FOV. In an embodiment, one or more techniques, known to a person skilled in the art may be implemented in the optimal image source 102 to obtain the one or more optimal images of the one or more objects.

Further, the FOV reconstruction system 101 includes a processor 106, an I/O interface 107, one or more modules 108 and a memory 109. In some embodiments, the memory 109 may be communicatively coupled to the processor 106. The memory 109 stores processor executable instructions, which, on execution, may cause the FOV reconstruction system 101 to perform the reconstruction of the FOV. The FOV reconstruction system 101 may be implemented in a variety of computing systems, such as a laptop computer, a desktop computer, a Personal Computer (PC), a notebook, a smartphone, a tablet, e-book readers, a server, a network server, and the like.

For the reconstruction, initially, a FOV which is to be reconstructed may be focussed by the microscope 103. The one or more techniques, known to a person skilled in the art, may be implemented to achieve the focus of the FOV. Upon focussing, presence of one of a single object and two or more distinct objects in the FOV of the image of the sample 105 may be determined. The presence of one of the single object and the two or more distinct objects may be determined based on sharpness associated with the one or more objects. A single optimal representation of the FOV may be generated when the presence of the single object is determined. For the single optimal representation, one or more second optimal images associated with the single object in the FOV may be retrieved from the optimal image source 102. In the embodiment, the one or more second optimal images may be selected from the plurality of images associated with the single object. Each of the plurality of images may be captured at different depth value, associated with the single object, in the sample. The one or more second optimal images may be selected from said plurality of images. One or more techniques, known to a person skilled in the art may be implemented for selecting the one or more second optimal images from the plurality of images of the single object. Further, one of selecting single second optimal image and stitching two or more second optimal images may be performed to generate the single optimal representation.

When presence of the two or more distinct objects is determined, at least one of the single optimal representation and a depth-based enhanced representation of the FOV may be generated by the FOV reconstruction system 101. For generating the depth-based enhanced representation, one or more first optimal images associated with each of the two or more distinct objects in the FOV may be retrieved from the optimal image source 102. An optimal representation of each of the two or more distinct objects may be generated based on the corresponding one or more first optimal images. In the embodiment, the one or more first optimal images for each of the two or more distinct objects may be selected from plurality of images associated with corresponding distinct object. Each of the plurality of images may be captured at different depth value, associated with the corresponding distinct object, in the sample. The one or more first optimal images may be selected from said plurality of images. One or more techniques, known to a person skilled in the art may be implemented for selecting the one or more first optimal images from said plurality of images of the corresponding distinct object. Further, the optimal representation of each of the two or more distinct objects is placed at a corresponding optimal depth associated with respective distinct object to generate the depth-based enhanced representation. The optimal depth associated with each of the one or more distinct objects may be determined based on depth value associated with sharpness peak of corresponding distinct object. In an embodiment, the optimal representation of the each of the two or more distinct objects may be generated by performing one of selecting single first optimal image and stitching two or more first optimal images.

In an embodiment of the present disclosure, the FOV reconstruction system 101 may be configured to notify the reconstructed FOV to be at least one of the single optimal representation and the depth-based enhanced representation to the user (not shown in the Figure) associated with the FOV reconstruction system 101 based on a delta ratio. In an embodiment, the delta ratio may be determined by identifying one or more sharpness peaks in a plot indicating variation of sharpness of the one or more objects across plurality of depths in the sample 105. The plot may be generated for the FOV based one or more techniques known to a person skilled in the art. Further, number of distinct objects above each other in the FOV in the FOV may be determined based on the one or more sharpness peaks in the plot. In an embodiment, each of the one or more sharpness peaks in the plot may indicate each of the two or more distinct objects. For example, if there exists one sharpness peak in the plot, the number of distinct objects above each other in the FOV may be zero. If there exist two sharpness peaks in the plot, the number of distinct objects above each other in the FOV may be two and so on. Based on the number of distinct objects above each other in the FOV and the number of one or more objects in the sample 105, the delta ratio may be computed. In an embodiment, number of one or more objects in the sample 105 may be determined by generating a plot indicating variation of sharpness of the one or more objects across the plurality of depths in complete image of the sample.

In an embodiment, the FOV reconstruction system 101 may be configured to smooth boundaries of the reconstructed FOV using a smoothing technique and the reconstructed FOV may be placed at a corresponding region, associated with the FOV, in an empty image of the sample. In an embodiment, upon placing each of the one or more reconstructed FOVs in the empty image, the reconstructed image of the sample 105 may be generated. In an embodiment, the reconstructed image may be provided to the user for the examination.

In an embodiment, the FOV reconstruction system 101 may receive data for reconstructing the FOV through the I/O interface 107 of the FOV reconstruction system 101. Also, the FOV reconstruction system 101 may transmit data for reconstructing the FOV via the I/O interface 107. The I/O interface 107 may be coupled with the processor 106 of the FOV reconstruction system 101.

Figure 2:
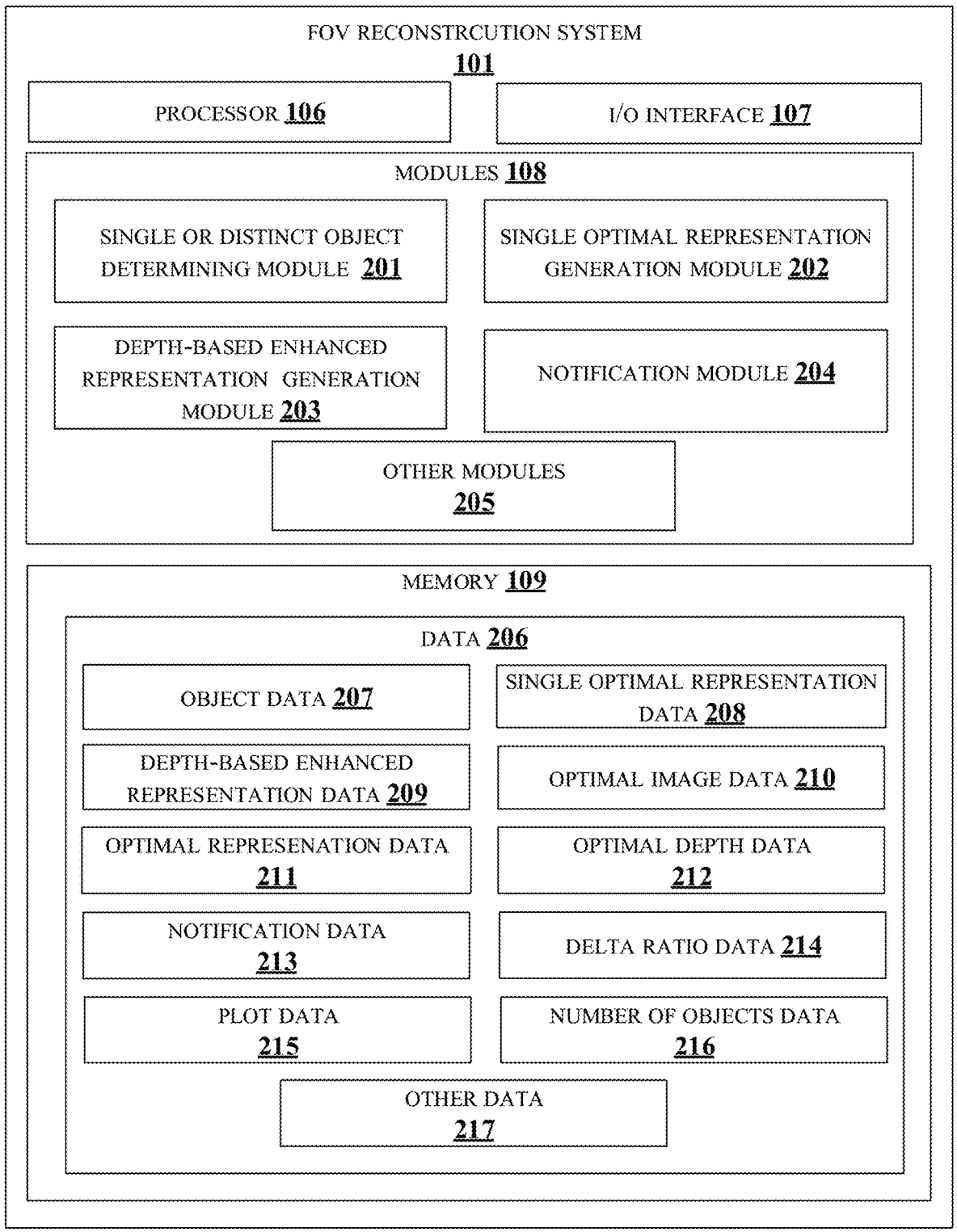
FIG. 2 shows a detailed block diagram of a FOV reconstruction system in accordance with some embodiments of the present disclosure.

FIG. 2 shows a detailed block diagram of the FOV reconstruction system 101 in accordance with some embodiments of the present disclosure.

The data 206 in the memory 109 and the one or more modules 108 of the FOV reconstruction system 101 may be described herein in detail.

In one implementation, the one or more modules 108 may include, but are not limited to, a single or distinct object determining module 201, a single optimal representation generation module 202, a depth-based enhanced representation generation module 203, a notification module 204 and one or more other modules 205, associated with the FOV reconstruction system 101.

In an embodiment, the data 207 in the memory 109 may comprise an object data 207 comprising single object data (also referred as a single object 207a) and two or more distinct object data (also referred as two or more distinct objects 207b), a single optimal representation data 208 (also referred as a single optimal representation 208), a depth-based enhanced representation data 209 (also referred as a depth-based enhanced representation 209), an optimal image data 210 comprising one or more first optimal image data (also referred as one or more first optimal images 210a), and one or more second optimal image data (also referred as one or more second optimal images 210b), an optimal representation data 211 (also referred as an optimal representation 211), an optimal depth data 212 (also referred as an optimal depth 212), a notification data 213 (also referred as a notification 213), a delta ratio data 214 (also referred as a delta ratio 214), a plot data 215 (also referred as a plot 215), number of objects data 216 (also referred as number of one or more objects 216) and other data 217 associated with the FOV reconstruction system 101.

In an embodiment, the data 206 in the memory 109 may be processed by the one or more modules 108 of the FOV reconstruction system 101. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The one or more modules 108 when configured with the functionality defined in the present disclosure may result in a novel hardware.

Figure 4A:
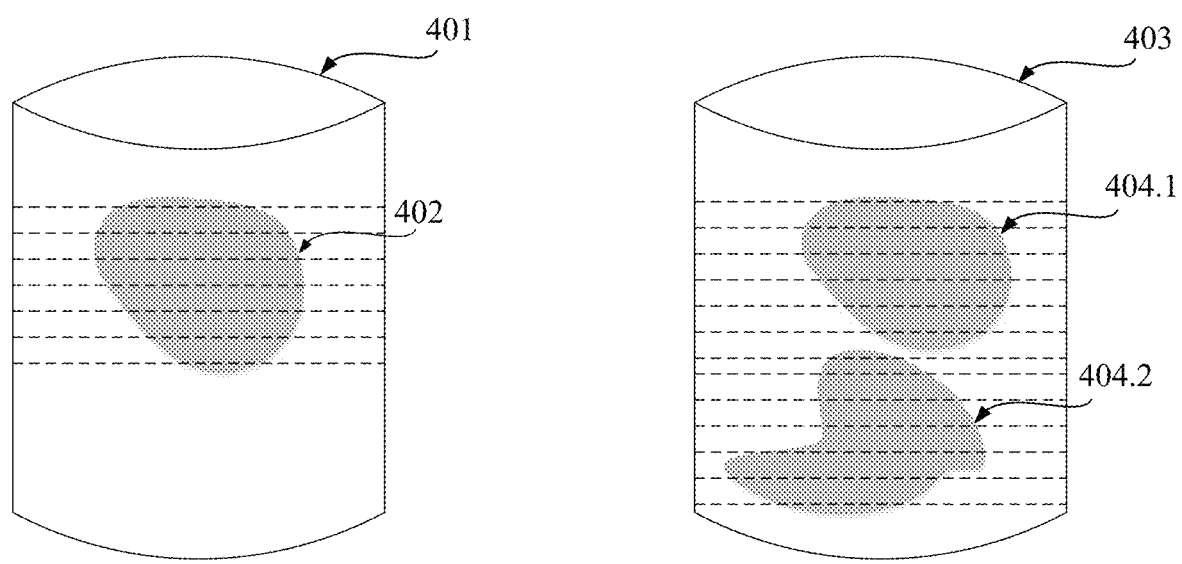
FIG. 4a illustrates exemplary representations of FOVs in an image of a sample comprising one or more objects in accordance with some embodiments of present disclosure.

A FOV to be reconstructed by the FOV reconstruction system 101 may comprise a single object 207a or two or more distinct objects 207b. By the reconstruction method proposed in the present disclosure, an optimal representation 211 of each of the one or more objects in the FOV may be provided to the user. Exemplary representations of the FOVs comprising the single object 207a and the two or more objects may be illustrated in FIG. 4a. FOV 401 illustrates a single object 402, suspended across the plurality of depths of the sample. FOV 403 illustrates two or more distinct objects 404.1 and 404.2 across the plurality of depths of the sample.

Figure 4B:
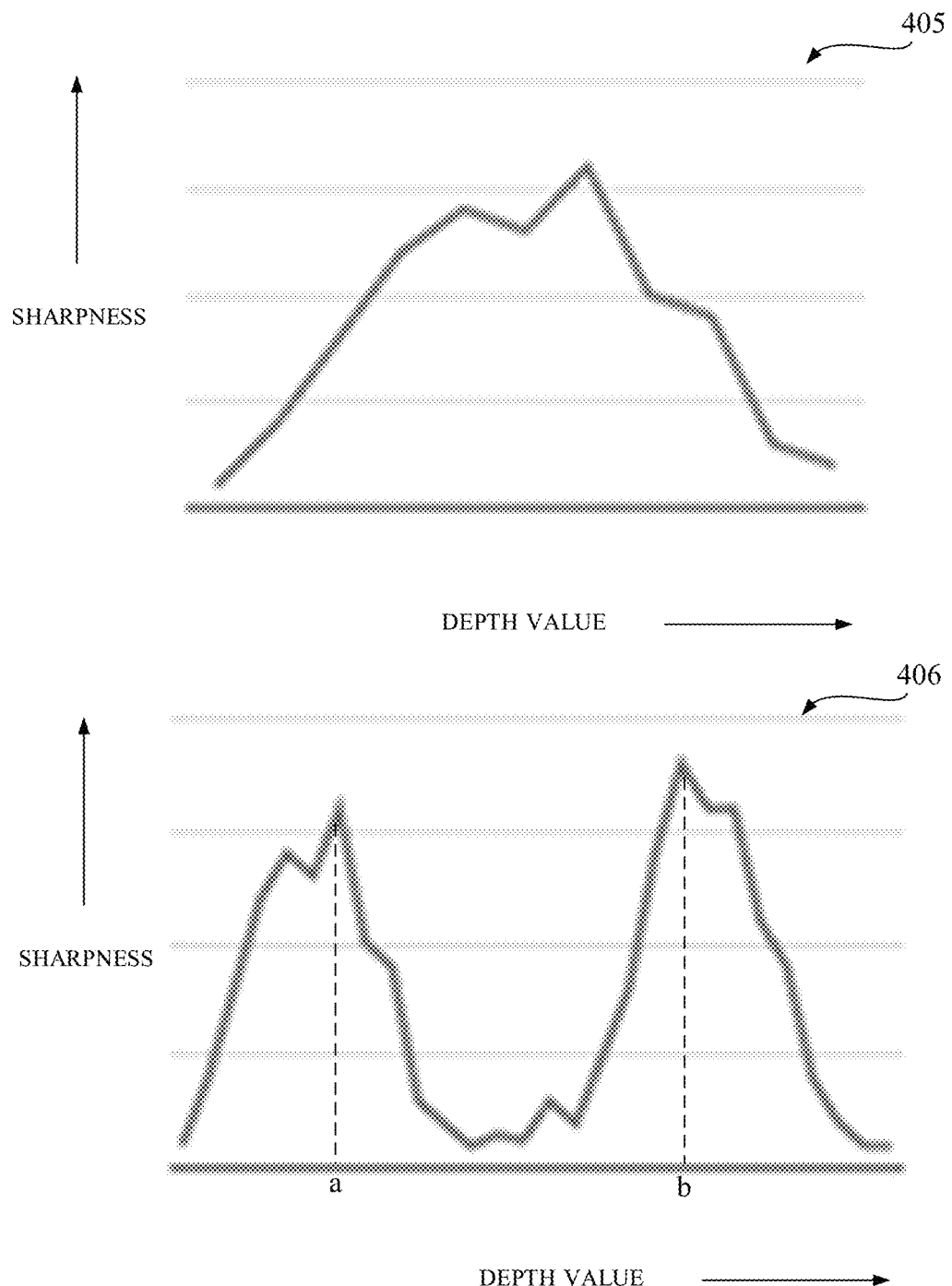
FIG. 4b illustrates exemplary representations of plots of FOVs, indicating variation of sharpness of one or more objects across plurality of depths in accordance with some embodiments of present disclosure.

Initially, presence of one of the single object 402 and the two or more distinct objects 404.1 and 404.2 may be determined in the FOV by the single or distinct object determining module 201. The presence of the single object 402 and the two or more distinct objects 404.1 and 404.2 may be determined based on sharpness of the one or more objects. In an embodiment, a plot 215 indicating variation of sharpness of the one or more objects across plurality of depths in the FOV may be generated. The plot 215 may be generated for the FOV based one or more techniques known to a person skilled in the art. In an embodiment, the sharpness associated with each of one or more objects in each of the plurality of depth may be determined based variance of Laplacian determined for an image captured at the corresponding depth. Exemplary representation of the plot 215 for the FOV 401 comprising the single object 402 is illustrated in plot 405 of FIG. 4b and exemplary representation of the plot 215 for the FOV 403 comprising the two or more distinct objects 404.1 and 404.2 is illustrated in plot 406 of FIG. 4b.

In an embodiment, one or more techniques for finding well-separated significant peaks may be implemented in the present disclosure. Said one or more techniques may include to perform filtering of the generated plot 215. The filtering may be performed using a filtering technique, which may include, a 1-Dimension (1-D) gaussian filter, Savitzky-Golay filter and so on. A discrete derivative on the smoothened data may be applied to detect the one or more sharpness peaks in the data. The number of sharpness peaks may be determined with count being only one for certain window length. By this, peaks that are too close are most likely from the same object and may be filtered out. Further, a Gaussian mixture model may be implemented for determining gaussian mean for each of the peaks. Detection of each of the peak to be associated with different objects may be performed based on the gaussian mean. In an embodiment, the detection may be performed based in the separation factor associated with two adjacent peaks. The separation factor of the two adjacent peaks, comprising first sharpness peak and second sharpness peak, may be determined using equation 1, given below:

$$\text{Separation factor} = (\mu_{k+1} - \mu_k) \div (\sigma_k + \sigma_{k+1}) \quad (1)$$

where, $\mu_k$ is gaussian mean associated with the first sharpness peak;

$\mu_{k+1}$ is gaussian mean associated with the second sharpness peak;

$\sigma_k$ is peak broadness value associated with the first sharpness peak; and $\sigma_{k+1}$ is peak broadness value associated with the second sharpness peak.

One or more techniques, known to a person skilled in the art may be implemented for determining the peak broadness value of each of the two adjacent peaks. In an embodiment, said two adjacent peaks may be detected to be associated with different objects when the determined separation factor is greater than a predefined separation factor. Further, the said two adjacent peaks may be detected to be associated with same object when the determined separation factor is lesser than a predefined separation factor.

Further, from the plots, it may be understood that the sharpness of the object increases with increase in the depth value until optimal depth 212 of the object may be reached. With further increase in the depth value, the sharpness of the objects decreases gradually. Hence, each of the one or more sharpness peaks in the plot 215 may relate to each of the one or more objects in the FOV. Therefore, the number of sharpness peaks in the plot 215 indicate number of distinct objects above each other in the FOV. Consider the plot 405 for the FOV 401 in FIG. 4b. The number of the sharpness peaks in the plot 405 is one. There are no objects which are one above the other. Hence, the number of distinct objects above each other in the FOV may be zero. Therefore, from the plot 405, the FOV reconstruction system 101 may determine presence of the single object 402 in the FOV 401. Similarly, consider the plot 406 for the FOV 403. The number of the sharpness peaks in the plot 406 is two. Hence, the number of distinct objects above each other in the FOV may be two. Therefore, from the plot 406, the FOV reconstruction system 101 may determine presence of the two or more distinct objects 404.1 and 404.2 in the FOV 403.

The FOV reconstruction system 101 generates the single optimal representation 208 of the FOV when the presence of the single object 207a is determined. Hence, for the FOV

401, a single optimal representation 208 may be generated by the single optimal representation generation module 202 upon determining the presence of the single object 402. For generating the single optimal representation 208, the one or more second optimal images 210b associated with the single object 402 in the FOV may be retrieved from the optimal image source 102. In an embodiment, the one or more second optimal images 210b may be images with one or more highest values of the sharpness of the single object 402. In the embodiment, the optimal image source 102 may be configured to select the one or more optimal images from one or more images of the single object 402. The one or more images may be captured at each of the plurality of depths associated with the single object 402. One or more techniques, known to a person skilled in the art may be implemented on the optimal image source 102 for selecting the one or more optimal images. Upon retrieving the one or more second optimal images 210b, the FOV single optimal representation generation module 202 performs one of selecting single second optimal image and stitching two or more second optimal images to generate the single optimal representation 208. When the single second optimal image is retrieved from the optimal image source 102, as the one or more second optimal images 210b, said single second optimal image may be selected and used as the single optimal representation 208 of the FOV 401. When the two or more second optimal images are retrieved from the optimal image source 102, as the one or more second optimal images 210b, said two or more second optimal images may be stitched together to generate the single optimal representation 208 of the FOV. One or more techniques, known to a person skilled in the art may be implemented for performing stitching of the two or more second optimal images.

In an embodiment, the stitching of two or more images may be performed based on the Laplacian value and tensor value associated with each of the two or more images. A stitched image, upon stitching of the two or more images, may be obtained using equation 2, given below:

$$\text{Stitched image} = \Sigma_{k=1}^{N}(W_k * I_k) \div \Sigma_{k=1}^{N} W_k \quad (2)$$

where, N is number of two or more images which are to be stitched;
$I_k$ is the $K^{th}$ image; and
$W_k$ is the tensor of the same dimension as $K^{th}$ image $I_k$.
In an embodiment, $W_k$ may be computed using equation 3, given below:

$$W_k = m(x,y) \circledast L_k^2(x,y) - (m(x,y) \circledast L_k(x,y))^2 \quad (3)$$

where, $L_k$ is the Laplacian of the image $I_k$;
N is total number of images;
m(x,y) is mean filter; and
⊛ is the discrete convolution operator for tensors of the two or more images.

In an embodiment of the present disclosure, the single optimal representation 208 for the FOV 401 may be generated by performing equations 2 and 3 on the two or more second optimal images.

Figure 5:
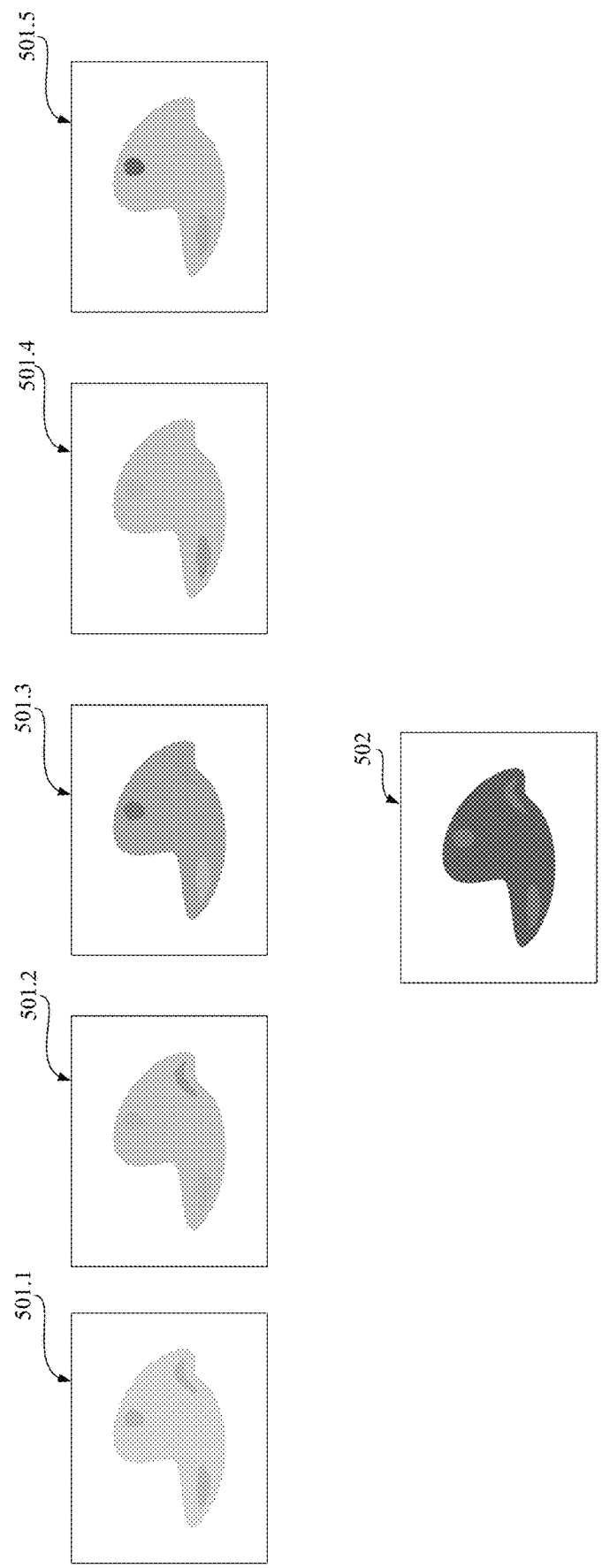
FIG. 5 illustrates representation of one or more optimal images and a stitched image of an object in FOV in accordance with some embodiments of present disclosure.

FIG. 5 illustrates exemplary representations of the two or more second optimal images 501.1 ... 501.5 and the stitched image 502. By implementing equations 2 and 3 on the two or more second optimal images 501.1 ... 501.5, the stitched image 502 may be obtained. As, illustrated in the figure, the stitched image 502 provide a better representation of the object with an optimal focus of the object.

Further, the FOV reconstruction system 101 generates at least one of the single optimal representation 208 and the depth-based enhanced representation 209 of the FOV when the presence of the two or more distinct objects 207b is determined. For the FOV 403, a depth-based enhanced representation 209 may be generated by the depth-based enhanced representation generation module 203 upon determining the presence of the two or distinct objects 404.1 and 404.2. For generating the depth-based enhanced representation 209, the one or more first optimal images 210a associated with each of the two or more distinct objects 404.1 and 404.2 in the FOV 403 may be retrieved from the optimal image source 102. In an embodiment, the one or more first optimal images 210a may be images with one or more highest values of the sharpness of corresponding distinct images. In the embodiment, the optimal image source 102 may be configured to select the one or more first optimal images 210a of a distinct object from the two or more distinct objects 404.1 and 404.2, from one or more images of corresponding distinct object. The one or more images may be captured at each of the plurality of depths associated with the distinct object. One or more techniques, known to a person skilled in the art may be implemented in the optimal image source 102 for selecting the one or more optimal images. Upon retrieving the one or more first optimal images 210a, the depth-based enhanced representation generation module 203 generates optimal representation 211 of each of the two or more distinct objects 404.1 and 404.2. The optimal representation 211 of each of the two or more distinct objects 404.1 and 404.2 is generated based on the corresponding one or more first optimal images 210a. In an embodiment, the optimal representation 211 of the each of the two or more distinct objects 404.1 and 404.2 may be generated by performing one of selecting single first optimal image and stitching two or more first optimal images.

Further, the optimal representation 211 of each of the two or more distinct objects 404.1 and 404.2 is placed at a corresponding optimal depth 212 associated with respective distinct object to generate the depth-based enhanced representation 209. The optimal depth 212 associated each of the one or more distinct objects may be determined based on depth value associated with sharpness peak of corresponding distinct object. When the single first optimal image is retrieved from the optimal image source 102, as the one or more first optimal images 210a, said single first optimal image may be used as the optimal representation 211 of corresponding distinct object. When the two or more first optimal images are retrieved from the optimal image source 102, as the one or more first optimal images 210a, said two or more first optimal images may be stitched together to use as the optimal representation 211 of the corresponding distinct object. For example, consider a single first optimal image is retrieved for the distinct object 404.1, the single first optimal image may be selected as the optimal representation 211 of the distinct object 404.1. Consider two or more first optimal images are retrieved for the distinct object 404.2, the two or more first optimal images may be stitched using equations 2 and 3 to obtain a stitched image, the stitched image may be used at the optimal representation 211 of the distinct object 404.2.

Further, the optimal representation 211 of each of the two or more distinct objects are placed at an optimal depth 212 associated with the respective distinct image. In an embodiment, the optimal depth 212 associated each of the two or more distinct objects 404.1 and 404.2 may be determined based on depth value associated with sharpness peak of corresponding distinct object. From the plot 406 for the FOV 403, the optimal representation 211 of the distinct object 404.1 may be placed at depth value at point 'a' in the plot

406. Similarly, the optimal representation 211 of the distinct object 404.2 may be placed at depth value at point 'b' in the plot 406.

The generation of the single optimal representation 208 of the FOV 403 may include single optimal representation 208 of one of the two or more distinct objects 207*b*. In an embodiment, the single optimal representation 208 of the distinct object associated with lesser depth value may be generated. For example, for FOV 403, the single optimal representation 208 of the distinct object 404.1 may be generated.

In an embodiment, the FOV reconstruction system may be configured to smooth boundaries of the reconstructed FOV using a smoothing technique. The reconstructed FOV may be one or more the single optimal representation 208 and the depth-based enhanced representation 208. The reconstructed FOV may be placed at a corresponding region, associated with the FOV, in an empty image of the sample. In an embodiment, upon placing each of the one or more reconstructed FOVs in the empty image, the empty image may be providing to the user for the examination.

Further, the notification module 204 of the FOV reconstruction system 101 may be configured to provide the notification 213 to the user. The notification 213 may include information of the reconstructed FOV to be at least one of the single optimal representation 208 and the depth-based enhanced representation 209 to the user (not shown in the Figure) associated with the FOV reconstruction system based on the delta ratio 214. In an embodiment, the delta ratio 214 may be determined by identifying one or more sharpness peaks in the plot 215 associated with the FOV. The number of distinct objects above each other in the FOV may be determined based on the one or more sharpness peaks in the plot 215 as described previously. Based on the number of distinct objects above each other in the FOV and the number of one or more objects 216 in the sample, the delta ratio 214 may be computed. In an embodiment, number of one or more objects 216 in the sample may be determined by generating a plot 215 indicating variation of sharpness of the one or more objects across the plurality of depths in the complete image of the sample. In an embodiment, the delta ratio 214 may be computed using equation 4, given below:

$$\text{Delta ratio} = \frac{N2}{N1} \quad (4)$$

where, N1 is the number of one or more objects 216 in the sample; and

N2 is the number of distinct objects one above the other in the FOV.

Consider the number of one or more objects 216 in the sample may be five. For the FOV 403, form the plot 406, the number of distinct objects one above the other may be two. The delta ratio 214 associated with the FOV 403 may be computed using equation 4. Hence the delta ratio 214 associated with the FOV 403 may be ⅖=0.4. For the FOV 401, from the plot 405 of FIG. 4*b*, the number of distinct objects one above the other may be zero. The delta ratio 214 associated with the FOV 401 may be computed using equation 4. Hence, the delta ratio 214 associated with the FOV 401 may be 0/5=0.

In an embodiment, the user may be notified with value of the delta ratio 214 associated with of the FOV. By the value of the delta ratio 214, the user may be able to understand if the reconstructed FOV is one of the single optimal representation 208 and the depth-based enhanced representation 209. Also, with the value of the delta ratio, the user may be understand on how important the examination with the depth-based enhanced representation 209 is. Greater the value of delta ratio, greater is the importance of the depth based enhanced representation 209. In an embodiment, the user may be provisioned to select the reconstructed FOV to be one of the single optimal representation 208 and the depth-based enhanced representation 209.

In an embodiment, value of the delta ratio 214 may vary from value 0 to 1. The user may understand that there are multiple distinct objects in the FOV when the delta ratio 214 is closer to the value '1' and the user may understand that there may be the single object 207*a* in the FOV when the delta ratio 214 is closer to the value '0'.

The other data 217 may store data, including temporary data and temporary files, generated by modules for performing the various functions of the FOV reconstruction system 101. The one or more modules 108 may also include other modules 205 to perform various miscellaneous functionalities of the FOV reconstruction system 101. In an embodiment, the one or more other modules may comprise a smoothing module to perform smoothing of boundaries of the reconstructed FOV. In an embodiment, the one or more other modules may comprise a placing module configured to place the reconstructed FOV at the corresponding region, associated with the FOV, in the empty image of the sample. It will be appreciated that such modules may be represented as a single module or a combination of different modules.

Figure 3A:
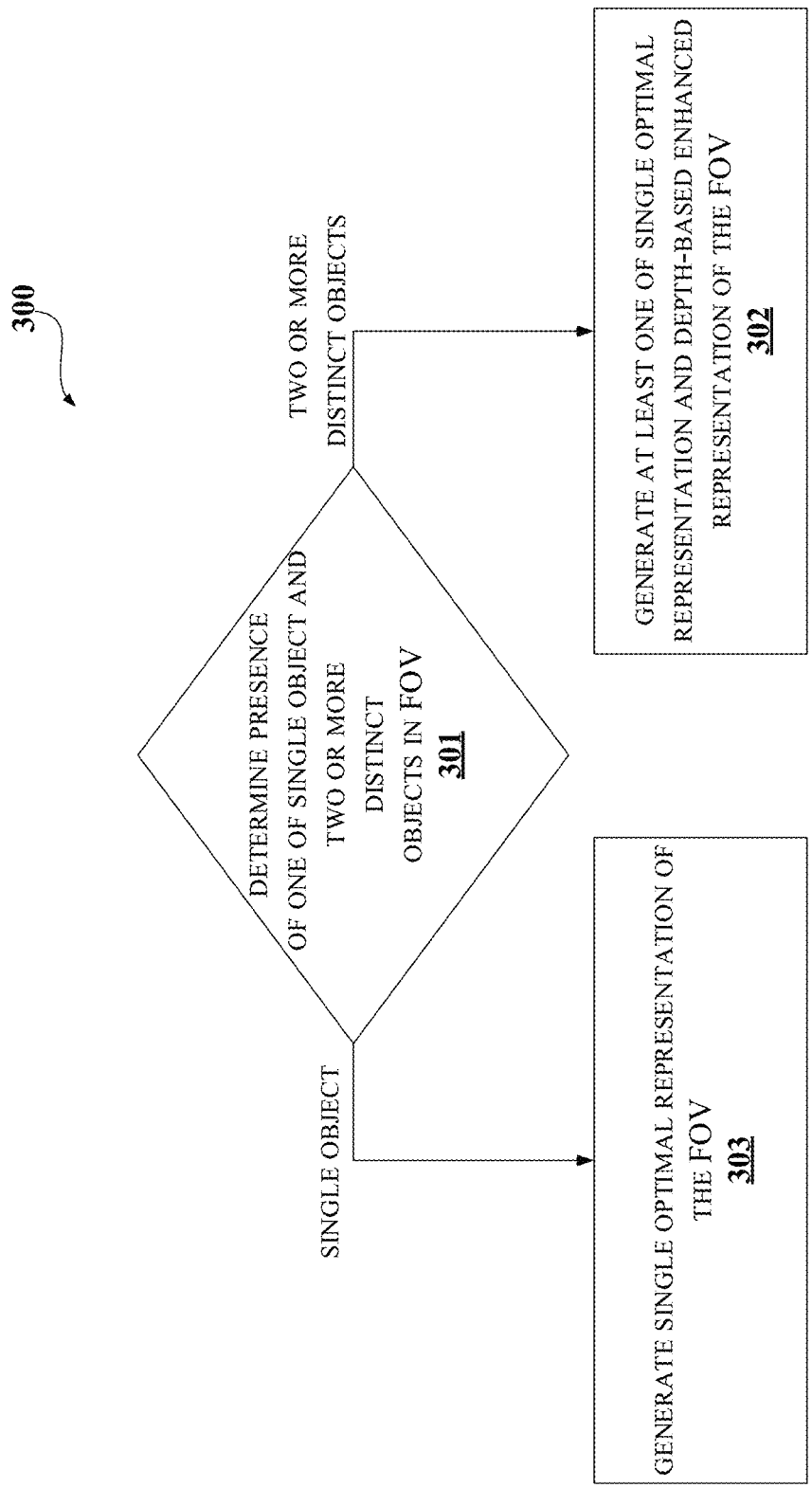
FIG. 3a illustrates a flowchart showing an exemplary method for reconstructing a FOV, in accordance with some embodiments of present disclosure.

FIG. 3*a* illustrates a flowchart showing an exemplary method for reconstructing the FOV, in accordance with some embodiments of present disclosure.

At block 301, the single or distinct object determining module 201 of the FOV reconstruction system 101 may determine presence of one of the single object 207*a* and the two or more distinct objects 207*b* in the FOV. The presence of one of the single object 207*a* and the two or more distinct objects 207*b* may be determined based on sharpness associated with the one or more objects in the FOV. When the presence of the single object 207*a* is determined, step at block 303 is performed. When the presence of the two or more distinct objects 207*b* is determined, step at block 302 is performed.

At block 302, when the presence of the two or more distinct objects 207*b* is determined, at least one of the single optimal representation 208 and the depth-based enhanced representation 209 of the FOV may be generated. The single optimal representation generation module 202 may be configured to generate the single optimal representation 208 and the depth-based enhanced representation generation module 203 may be configured to generate the depth-based enhanced representation 209.

At block 303, when the presence of the single object 207*a* is determined, the single optimal representation generation module 202 may be configured to generate the single optimal representation 208 of the FOV for the single object 207*a*.

Figure 3B:
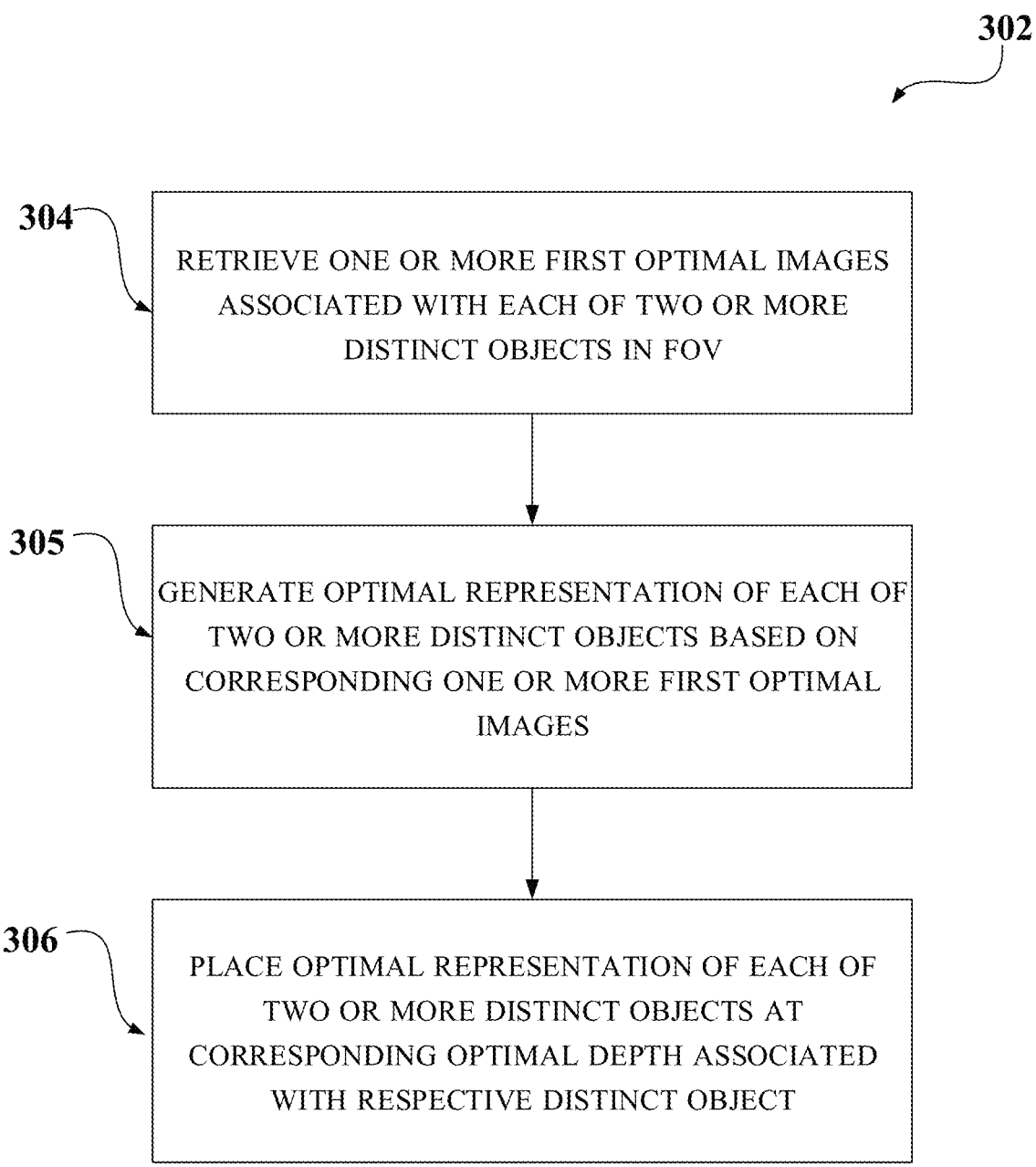
FIG. 3b illustrates a flowchart showing an exemplary method for generating a depth-based enhanced representation in accordance with some embodiments of present disclosure.

FIG. 3*b* illustrates a flowchart showing an exemplary method for generating the depth-based enhanced representation 209 of the FOV in accordance with some embodiments of present disclosure.

At block 304, the depth-based enhanced representation generation module 203 retrieves the one or more first optimal images 210*a* associated with each of the two or more distinct objects 207*b* in the FOV. The one or more first optimal images 210*a* may be retrieved from the optimal image source 102.

At block 305, the depth-based enhanced representation generation module 203 generates the optimal representation 211 of each of the two or more distinct objects 207b based on the corresponding one or more first optimal images 210a. The optimal representation 211 may be generated by performing one of selecting one first optimal image and stitching two or more first optimal images.

At block 306, the depth-based enhanced representation generation module 203 places the optimal representation 211 of each of the two or more distinct objects 207b at corresponding optimal depth 212 associated with respective distinct object.

Figure 3C:
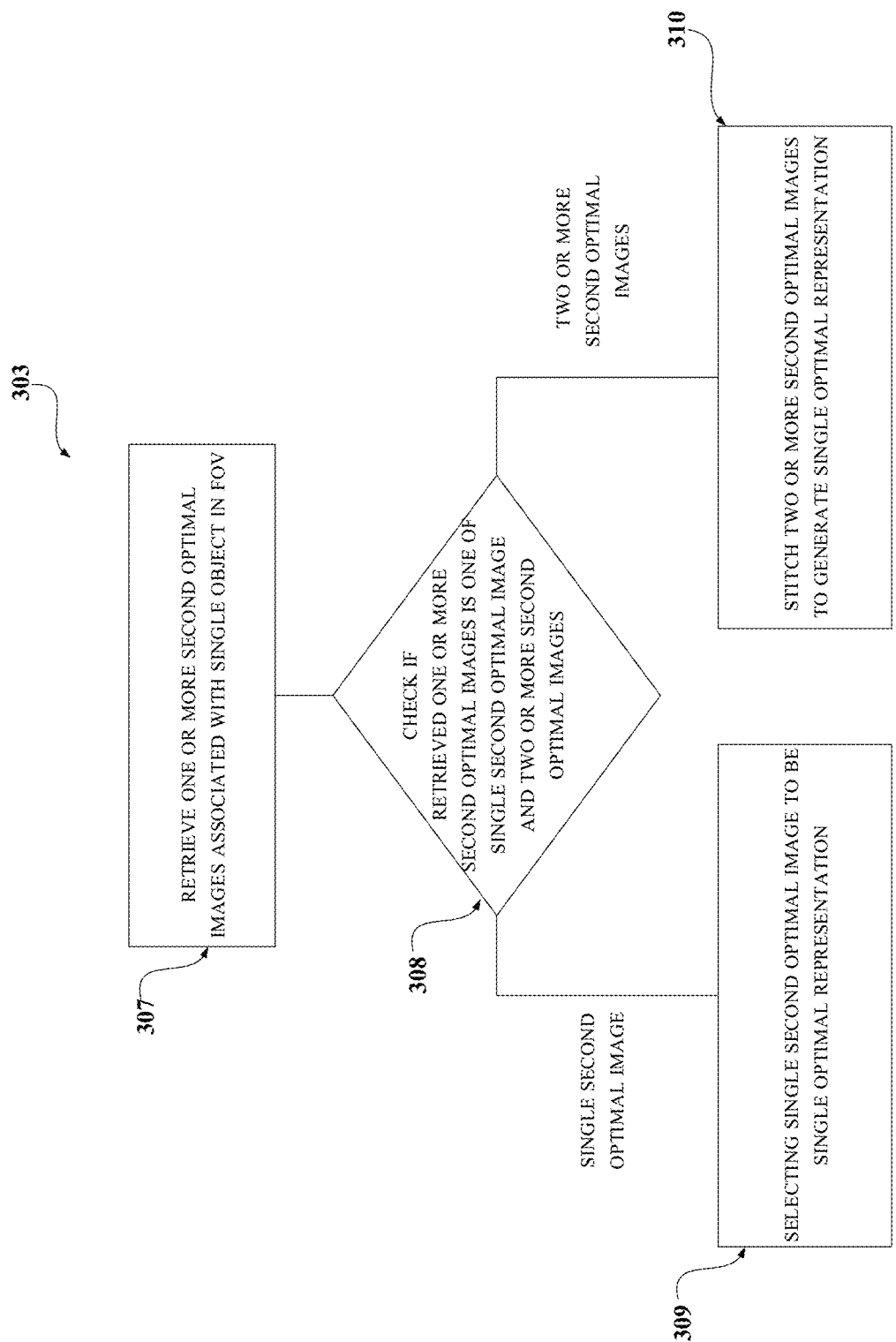
FIG. 3c illustrates a flowchart showing an exemplary method for generating a single optimal representation in accordance with some embodiments of present disclosure.

FIG. 3c illustrates a flowchart showing an exemplary method for generating the single optimal representation 208, in accordance with some embodiments of present disclosure.

At block 307, the single optimal representation generation module 202 retrieves the one or more second optimal images 210b associated with the single object 207a in the FOV. The one or more second optimal images 210b may be retrieved from the optimal image source 102.

At block 308, the single optimal representation generation module 202 performs one of selecting one second optimal image and stitching two or more second optimal images, to generate the single optimal representation 208.

As illustrated in FIGS. 3, 4 and 5, the methods 300, 302 and 303 may include one or more blocks for executing processes in the FOV reconstruction system 101. The methods 300, 302 and 303 may be described in the general context of computer executable instructions. Generally, computer executable instructions can include routines, programs, objects, components, data structures, procedures, modules, and functions, which perform particular functions or implement particular abstract data types.

The order in which the methods 300, 302 and 303 are described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

Computing System

Figure 6:
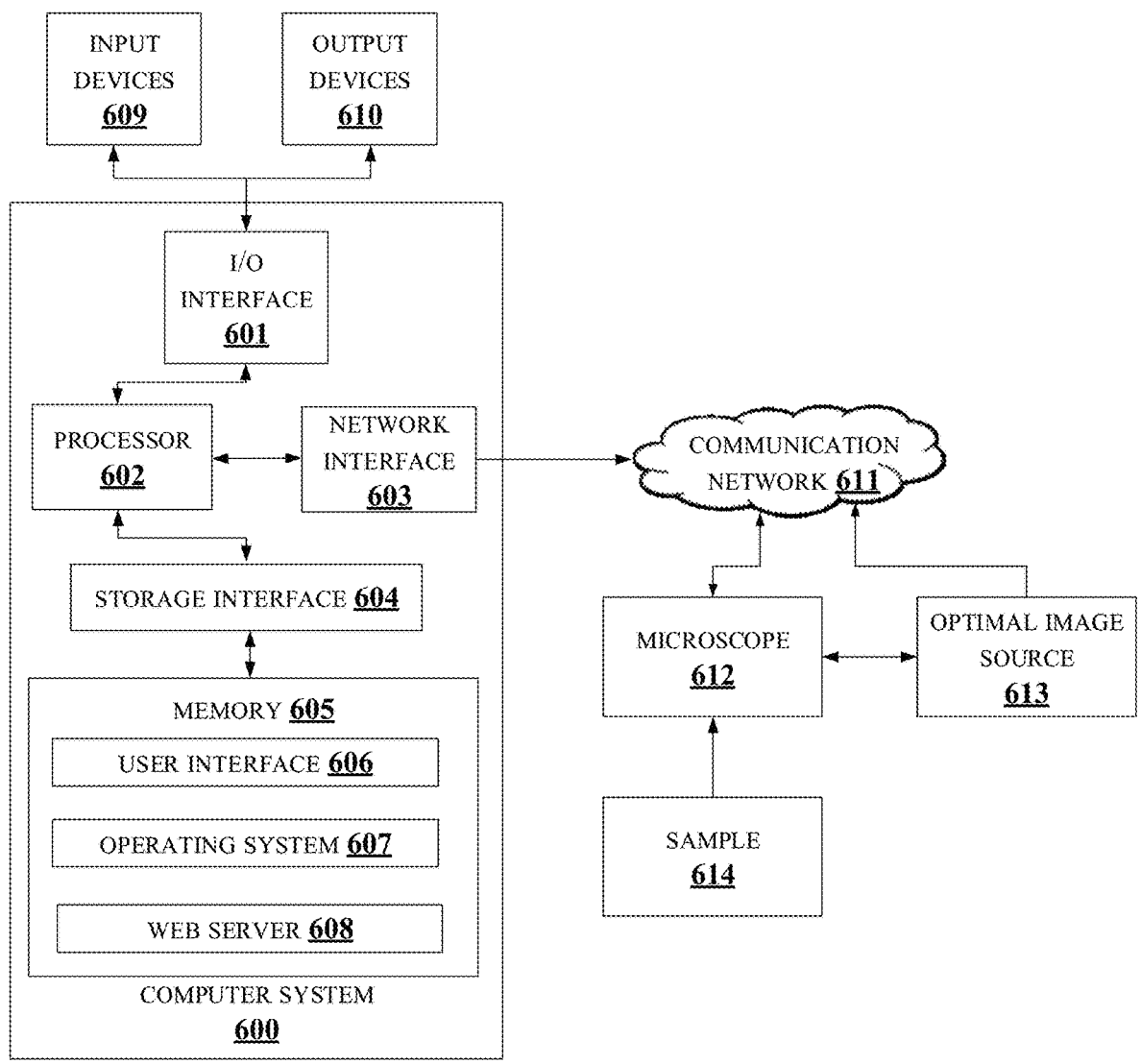
FIG. 6 illustrates a block diagram of an exemplary computer system for implementing embodiments consistent with the present disclosure.

FIG. 6 illustrates a block diagram of an exemplary computer system 600 for implementing embodiments consistent with the present disclosure. In an embodiment, the computer system 600 is used to implement the FOV reconstruction system 101. The computer system 600 may include a central processing unit ("CPU" or "processor") 602. The processor 602 may include at least one data processor for executing processes in Virtual Storage Area Network. The processor 602 may include specialized processing units such as, integrated system (bus) controllers, memory management control units, floating point units, graphics processing units, digital signal processing units, etc.

The processor 602 may be disposed in communication with one or more input/output (I/O) devices 609 and 610 via I/O interface 601. The I/O interface 601 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 601, the computer system 600 may communicate with one or more I/O devices 609 and 610. For example, the input devices 609 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 610 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 600 may consist of the FOV reconstruction system 101. The processor 602 may be disposed in communication with the communication network 611 via a network interface 603. The network interface 603 may communicate with the communication network 611. The network interface 603 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 611 may include, without limitation, a direct interconnection, local area network (LAN), wide area network (WAN), wireless network (e.g., using Wireless Application Protocol), the Internet, etc. Using the network interface 603 and the communication network 611, the computer system 600 may communicate with at least one of a microscope 612 and an optimal image source 613 for reconstructing a FOV of an image of a sample 614 placed under the microscope 612. The network interface 603 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 611 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 602 may be disposed in communication with a memory 605 (e.g., RAM, ROM, etc. not shown in FIG. 6) via a storage interface 604. The storage interface 604 may connect to memory 605 including, without limitation, memory drives, removable disc drives, etc., employing connection protocols such as, serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program or database components, including, without limitation, user interface 606, an operating system 607 etc. In some embodiments, computer system 600 may store user/application data 606, such as, the data, variables, records, etc., as described in this disclosure. Such databases may be implemented as fault-tolerant, relational, scalable, secure databases such as Oracle® or Sybase®.

The operating system 507 may facilitate resource management and operation of the computer system 700. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

Advantages

An embodiment of the present disclosure provisions optimal representation of each of one or more object present in a FOV.

An embodiment of the present disclosure provisions reduction in processing time required for analysing FOV at multiple depths by providing single optimal representation of each of the one or more objects at multiple depths.

An embodiment of the present disclosure eliminates redundancy in the FOV provided to the user for examination by considering only optimal images of objects. The need for the user to examine an object multiple times may also be eliminated.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fibre, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIGS. 3a, 3b and 3c show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Referral numerals:

| Reference Number | Description |
| --- | --- |
| 100 | Environment |
| 101 | FOV reconstruction system |
| 102 | Optimal image source |
| 103 | Microscope |
| 104 | Stage |
| 105 | Sample |
| 106 | Processor |
| 107 | I/O interface |
| 108 | Modules |
| 109 | Memory |
| 201 | Single or distinct object determining module |
| 202 | Single optimal representation generation module |
| 203 | Depth-based enhanced representation generation module |
| 204 | Notification module |
| 205 | Other modules |
| 206 | Data |
| 207 | Object data |
| 208 | Single optimal representation data |
| 209 | Depth-based enhanced representation data |
| 210 | Optimal image data |
| 211 | Optimal representation data |
| 212 | Optimal depth data |
| 213 | Notification data |
| 214 | Delta ratio data |
| 215 | Plot data |
| 216 | Number of objects data |
| 217 | Other data |
| 401 | FOV with single object |
| 402 | Single object |
| 403 | FOV with two or more distinct objects |
| 404.1 and 404.2 | Two or more distinct objects |
| 405 | Plot of FOV with single object |
| 406 | Plot of FOV with two or more distinct objects |
| 501.1 . . . 501.5 | Two or more optimal images |
| 502 | Stitched image |
| 600 | Computer System |
| 601 | I/O Interface |
| 602 | Processor |
| 603 | Network Interface |
| 604 | Storage Interface |
| 605 | Memory |
| 606 | User Interface |
| 607 | Operating System |
| 608 | Web Server |
| 609 | Input Devices |

-continued

Referral numerals:

| Reference Number | Description |
| --- | --- |
| 610 | Output Devices |
| 611 | Communication Network |
| 612 | Microscope |
| 613 | Optimal image source |
| 614 | Sample |

We claim:

1. A method for reconstructing a Field Of View (FOV), comprising:
 determining, by a FOV reconstruction system, presence of one of a single object and two or more distinct objects in a FOV of an image of a sample comprising one or more objects, based on sharpness of the one or more objects;
 generating, by the FOV reconstruction system, a single optimal representation of the FOV when the presence of the single object is determined; and
 generating, by the FOV reconstruction system, at least one of the single optimal representation and a depth-based enhanced representation of the FOV, when the presence of the two or more distinct objects is determined, wherein, generating the depth-based enhanced representation comprises:
 retrieving one or more first optimal images associated with each of the two or more distinct objects in the FOV;
 generating an optimal representation of each of the two or more distinct objects based on the corresponding one or more first optimal images; and
 placing the optimal representation of each of the two or more distinct objects at a corresponding optimal depth associated with respective distinct object to generate the depth-based enhanced representation, for reconstructing the FOV.

2. The method as claimed in claim 1 further comprising notifying, by the FOV reconstruction system, the reconstructed FOV to be at least one of the single optimal representation and the depth-based enhanced representation to a user associated with the FOV reconstruction system based on a delta ratio.

3. The method as claimed in claim 2, wherein the delta ratio is determined by performing steps of:
 identifying one or more sharpness peaks in a plot indicating variation of sharpness of the one or more objects across plurality of depths in the sample;
 determining number of distinct objects above each other in the FOV, based on the one or more sharpness peaks; and
 computing the delta ratio of the FOV based on number of distinct objects above each other in the FOV and number of the one or more objects.

4. The method as claimed in claim 1, wherein generating the optimal representation of the each of the two or more distinct objects comprises performing one of selecting single first optimal image and stitching two or more first optimal images.

5. The method as claimed in claim 1, wherein the optimal depth associated each of the two or more distinct objects is determined based on depth value associated with sharpness peak of corresponding distinct object.

6. The method as claimed in claim 1, wherein generating of the single optimal representation, comprising:
retrieving one or more second optimal images associated with the single object in the FOV; and
performing one of selecting single second optimal image and stitching two or more second optimal images to generate the single optimal representation.

7. The method as claimed in claim 1 further comprising:
smoothing, by the FOV reconstruction system, boundaries of the reconstructed FOV using a smoothing technique; and
placing, by the FOV reconstruction system, the reconstructed FOV at a corresponding region, associated with the FOV, in an empty image of the sample.

8. A FOV reconstruction system for reconstructing a Field Of View (FOV), comprises:
a processor; and
a memory communicatively coupled to the processor, wherein the memory stores processor-executable instructions, which, on execution, cause the processor to:
determine presence of one of a single object and two or more distinct objects in a FOV of an image of a sample comprising one or more objects, based on sharpness of the one or more objects;
generate a single optimal representation of the FOV when the presence of the single object is determined; and
generate at least one of the single optimal representation and a depth-based enhanced representation of the FOV, when the presence of the two or more distinct objects is determined, wherein, generating the depth-based enhanced representation comprises:
retrieve one or more first optimal images associated with each of the two or more distinct objects in the FOV;
generating an optimal representation of each of the two or more distinct objects based on the corresponding one or more first optimal images; and
placing the optimal representation of each of the two or more distinct objects at a corresponding optimal depth associated with respective distinct object to generate the depth-based enhanced representation, for reconstructing the FOV.

9. The FOV reconstruction system as claimed in claim 8 further comprises the processor configured to notify the reconstructed FOV to be at least one of the single optimal representation and the depth-based enhanced representation to a user associated with the FOV reconstruction system based on a delta ratio.

10. The FOV reconstruction system as claimed in claim 9, wherein the delta ratio is determined by performing steps of:
identifying one or more sharpness peaks in a plot indicating variation of sharpness of the one or more objects across plurality of depths in the sample;
determining number of distinct objects above each other in the FOV in the FOV, based on the one or more sharpness peaks; and
computing the delta ratio of the FOV based on number of distinct objects above each other in the FOV and number of the one or more objects.

11. The FOV reconstruction system as claimed in claim 8, wherein generating the optimal representation of the each of the two or more distinct objects comprises performing one of selecting single first optimal image and stitching two or more first optimal images.

12. The FOV reconstruction system as claimed in claim 8, wherein the optimal depth associated each of the two or more distinct objects is determined based on depth value associated with sharpness peak of corresponding distinct object.

13. The FOV reconstruction system as claimed in claim 8, wherein generating of the single optimal representation, comprising:
retrieving one or more second optimal images associated with the single object in the FOV; and
performing one of selecting single second optimal image and stitching two or more second optimal images to generate the single optimal representation.

14. The FOV reconstruction system as claimed in claim 8 further comprises the processor configured to:
smooth boundaries of the reconstructed FOV using a smoothing technique; and
place the reconstructed FOV at a corresponding region, associated with the FOV, in an empty image of the sample.

* * * * *